Oct. 28, 1947.  J. B. BINGHAM ET AL  2,429,743
BEET HARVESTER
Filed July 24, 1945    3 Sheets-Sheet 1
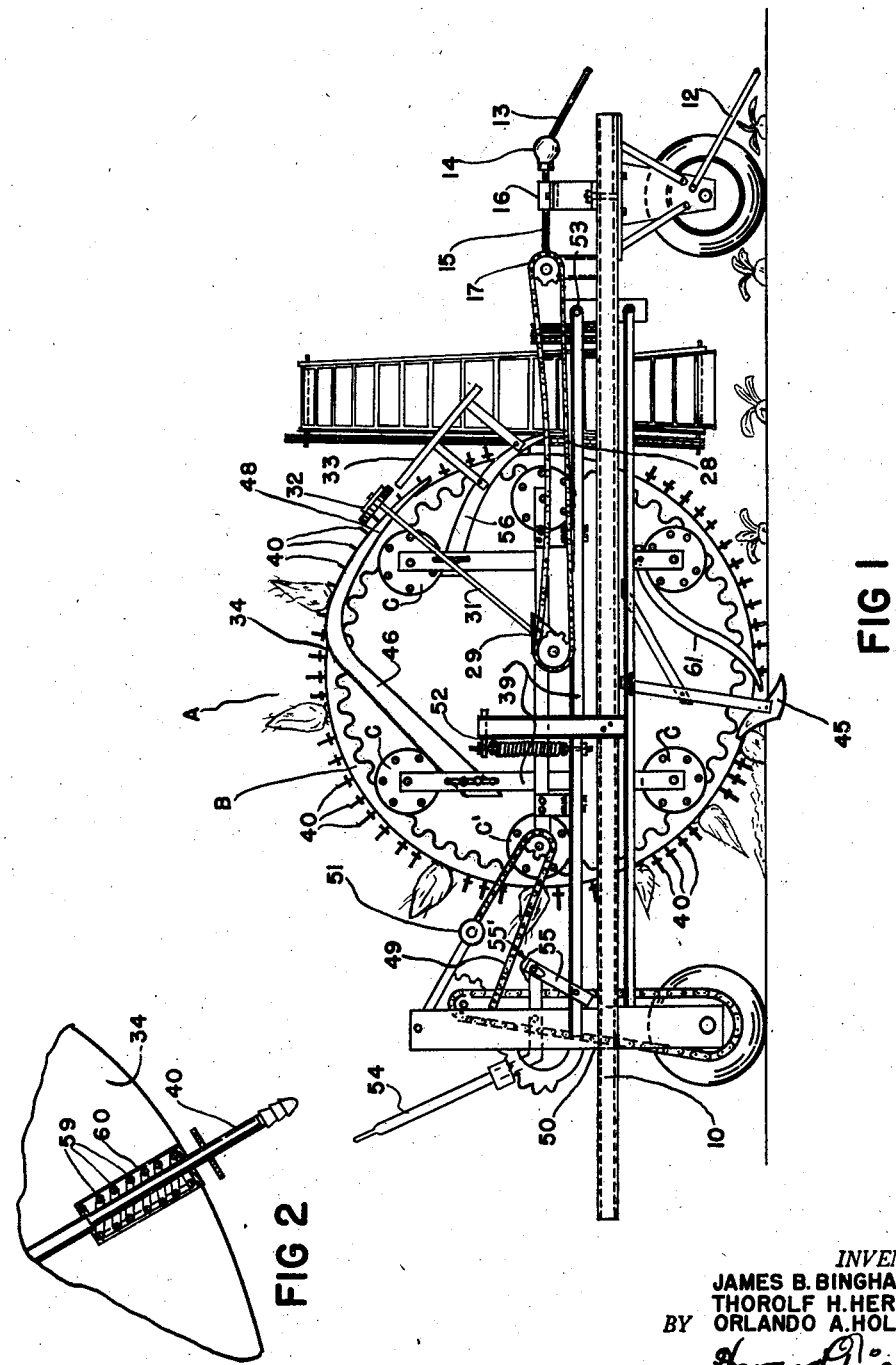
INVENTORS
JAMES B. BINGHAM
THOROLF H. HERBERG
BY ORLANDO A. HOLKESVIG

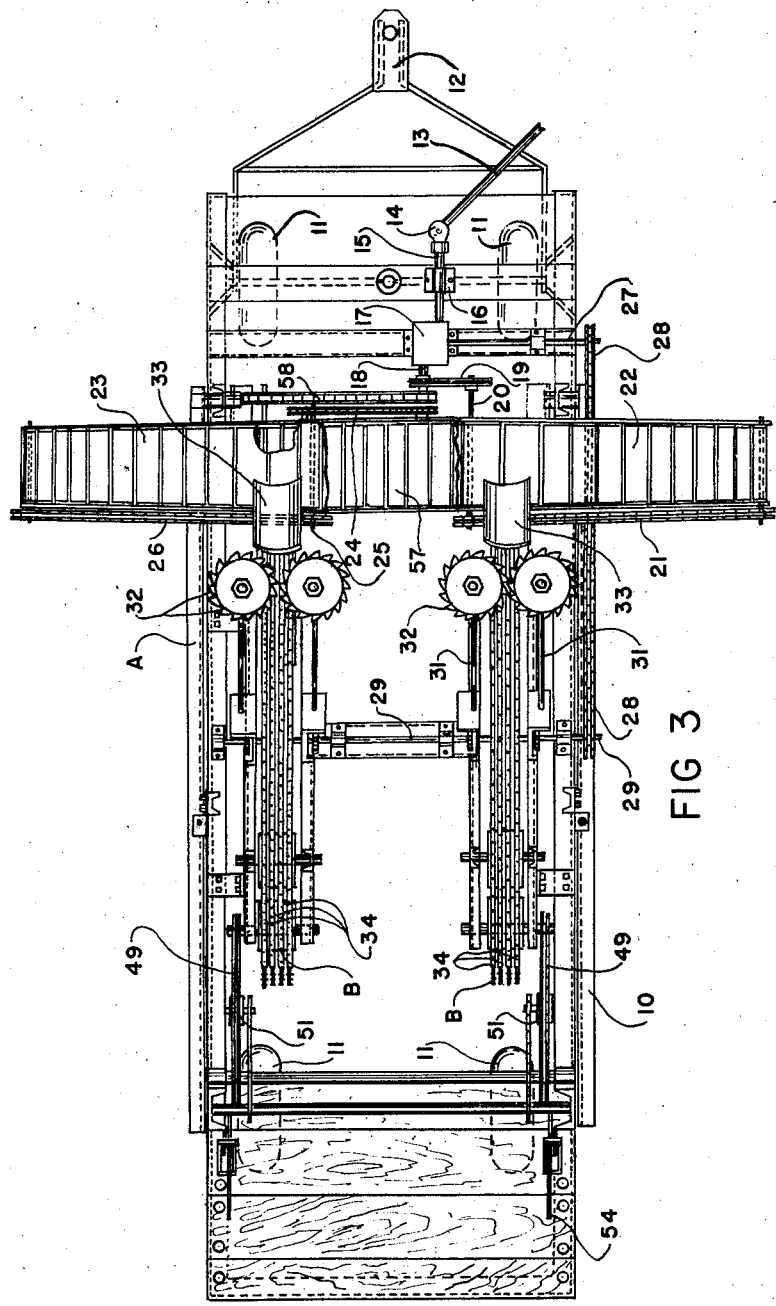

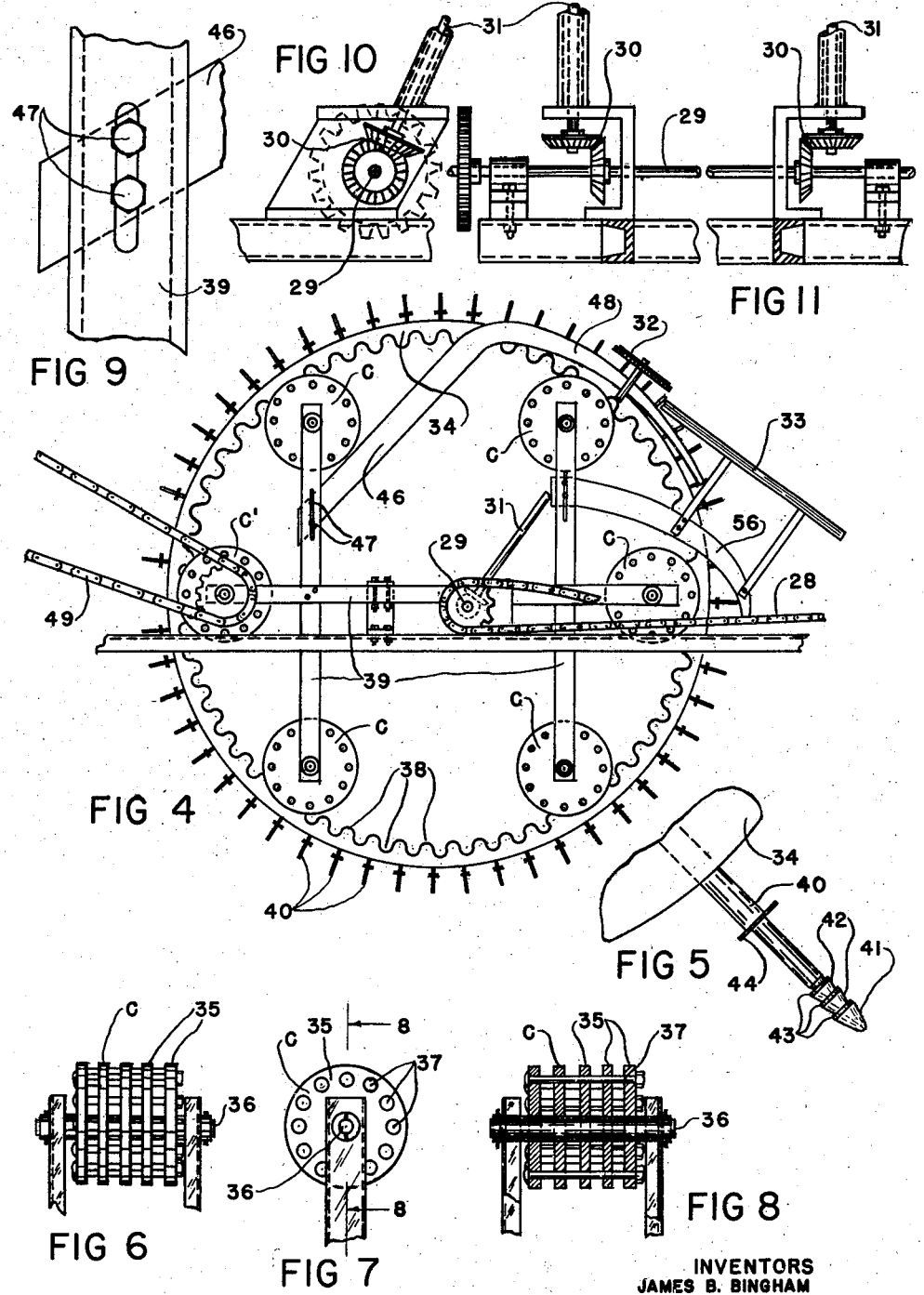

Patented Oct. 28, 1947

2,429,743

UNITED STATES PATENT OFFICE 2,429,743

BEET HARVESTER

James B. Bingham, Thorolf H. Herberg, and Orlando A. Holkesvig, Grand Forks, N. Dak.

Application July 24, 1945, Serial No. 606,850

15 Claims. (Cl. 55—108)

This invention relates to sugar beet harvesters designed to pick up the sugar beets and carry the same up to a point where the tops are cut away from the body of the beet and the body of the sugar beet is carried by a loading conveyer into the truck following along with the harvester or discharged to the side of the harvester.

A primary feature resides in providing the sugar beet harvester which is formed with a series of freely disposed or individual rims which are floatingly supported upon a series of idling gears. The idling gears are adapted to hold the respective rims spaced one from the other and in parallel relation to each other, each of the rims being freely rotatable on idle sprocket wheels to permit the rims to roll freely. Thus when the harvester is operated along the ground and the rims are brought into contact with the ground the rims will be freely rotated by friction with the ground and by power means provided to operate the rims through the supporting pinions, only one of the pinions serves to furnish a drive for all of the rims on one wheel in connection with or without traction from the ground. The pinions are supported stationary on a frame and the frame is adjustable to raise and lower the pinions as a unit to bring the surface of the rims into close proximity with the ground. The pinions serve as spacers and guides to hold the rims rotatable in parallel relation to each other.

A further feature resides in providing each of the rims with a series of prongs, spikes, or pegs of any desired length. The prongs or spikes are removably supported to the rims at regular intervals projecting from the outer edge of each rim. In operation should any of the spikes break off, the same can readily be replaced by a new spike.

The beet harvester may be used for sugar beets or vegetables of similar character. The purpose of this type of freely disposed rims with the prongs or spikes projecting from the peripheral edge of the rims, is that the prongs or spikes will be impaled in the crown or top of the sugar beet or vegetable and as the rim rotates the beet is lifted or carried around into a position where it is engaged by a cam to properly position the beet just before topping knives come into contact with the beet as it rotates to cut off the tops of the foliage.

It is also a feature to provide adjustable guide means between each pair of rims which will raise the sugar beet or vegetable engaged on the prongs or spikes at any desired height on the spikes which permits topping to any desired point on the sugar beet or vegetable. These guide cams are mounted in a manner so that there is one guide between each pair of rims and one on each outer side of the outer rims. These adjustable guides in one position act to carry the beet on the spikes before the tops are severed from the body of the beet or vegetable and the other set of guides or cams are adjustable to push the tops that have been severed from the body off the spikes as the rims rotate in the operation of the harvester.

A further feature resides in providing arms between the rims and the lower arch of the same which are adjustable so as to control the depth of penetration of the spikes into the crown of the sugar beet or vegetable.

It is a feature that the part of the sugar beet or vegetable consisting of the crown or top which remains on the spikes is carried to a point where topping arms are mounted on brackets on inside of wheels and so arranged that there is one arm between each pair of rims and one on each outer side of the outer rims. These arms are adjustable and act to remove from the rims whatever part of the sugar beet or vegetable remains engaged on the rims and spikes. The construction of the wheel which consists of a number of parallel disposed free rims is such that arms are fastened inside of the wheel and extend through and out between the rims which eliminates any dead ends for gathering of tops or vegetation and allows the top or crown to fall into a conveyer.

Further our beet harvester is composed of a unit consisting of the desired number of rims to make up one wheel which consists of a drive pinion means, guide rollers, idler rollers, topping adjustment guides, stripper arms and cutting discs. This unit is mounted on a frame which pivots from a point on the front of the chassis and the rear end of the frame is supported by springs. This allows an adjustment to be made to place any desired weight on the wheel unit contacting sugar beets or vegetables as the wheel rotates over the row of beets or vegetables and the frame supporting this unit is separate and apart from the lifting device.

Conveyers are provided to carry the roots or bodies of the beets either to a hopper, truck or to the ground and to either side of the machine through reversible gears. We also provide the conveyer to move the crowns or tops to either side of the machine which is so constructed that either one or two or even four rows or more of tops and crowns can be placed in one windrow, depending on the number of units mounted on the chassis.

The sugar beet combine can be built in either one row units or multiple rows as desired and furthermore the units can also be built to be in line or staggered on the chassis.

These features together with other details and objects will be more fully and clearly hereinafter set forth.

In the drawings forming part of the specification:

Figure 1 is a side view of our sugar beet harvester.

Figure 2 illustrates a detail of one of the spikes for picking up the beets.

Figure 3 is a plan view of our sugar beet harvester.

Figure 4 illustrates a detail of the pickup wheel in side elevation.

Figure 5 is a detail of one of the spikes or tines used on the pickup wheels.

Figure 6 illustrates the idler assembly for the freely disposed pickup wheels.

Figure 7 is a side view of detail of the idler assembly.

Figure 8 is a section on the line 8—8 of Figure 7.

Figure 9 is a detail showing the adjustment of one of the cam arms on the frame.

Figure 10 is a detail of the drive means for the topping saws in side elevation.

Figure 11 illustrates the transverse view across the frame of the machine illustrating the shafts and gears which drive the shafts that operate the topping saws.

The beet harvester A illustrated in side elevation in Figure 1 is formed with the supporting frame 10 and which is mounted on the rubber tired wheels 11 which travel over the ground. The frame 10 may be in the form of a trailer unit and by means of the tongue 12 may be attached to a tractor—not shown. The tractor which would be attached to the tongue 12 to draw the harvester A over the ground would also supply the power to the main drive shaft 13 which is connected by the universal joint 14 to the drive shaft 15. The shaft 15 is mounted in the bearings 16 at the front of the frame 10.

The shaft 15 extends into the transmission 17 from which a drive shaft 18 extends and which is adapted to operate the drive chain 19, which in turn operates the shaft 20 to operate the drive chain 21 which operates the conveyer 22.

The conveyer 22 extends to one side of the frame 10 of the harvester A. A second conveyer 23 extends to the opposite side of the frame and is adapted to be operated from the shaft 18 by the drive chain 24 which in turn operates the shaft 25 to drive the operating chain 26 which operates the conveyer 23.

The operating shaft 27 extends from the transmission 17 to drive the chain 28 which operates the transverse shaft 29. The shaft 29 operates the bevel gear 30 at each side of the machine and which gears are shown in Figures 10 and 11 to operate the shafts 31 which operate the topping saws 32 which are adapted to sever the top of the beet from the crown.

As the beets are topped by the topping knives of the saws 32 the bodies of the beets will drop into the chutes 33 which in turn carry the bodies of the beets on to the conveyers 22 and 23. The conveyers 22 and 23 will carry the bodies of the beets to one side of the harvester A and deposit the same either in a windrow or into the body of the truck following alongside the beet harvester A.

A primary feature of our beet harvester resides in the beet pickup wheels B. The harvester A is provided with two of these pickup wheels B one on each side of the frame 10 as illustrated in Figure 3.

The pickup wheels B are formed in a unit which comprises a series of fairly thin wheel rims 34. The rims 34 are illustrated in Figures 1 and 4 in side elevation. Each wheel B is made up of several of the rims 34 and each rim is separate and free from the adjacent rim. For example, the wheels B are made up of four wheel rims 34 or the wheel B may have any number of freely disposed wheel rims 34.

The wheel rims 34 are held collectively by a series of circumferentially spaced idler wheels made up in units C. Each unit C is made up of a series of plates 35 which are spaced apart and are freely rotatable on shafts 36. The unit C has a series of rods 37 extending through the discs 35 which form sprockets which are adapted to engage the internal teeth 38 formed on the inner edge of the wheels 34. A frame 39 supports the unit wheel C and this frame is adjustable to raise and lower the beet pickup wheels 34 as will be more fully and clearly hereinafter set forth.

The wheels 34 rotate on the pulley unit C and are held spaced apart by the plates 35 between which the wheels 34 rotate. In this manner the freely disposed rim wheels 34 are held virtually equally spaced apart and are free to rotate on the pulley units C about a common axis, around which the pulley units C are spaced.

It is also a feature of our beet harvester to provide the unit pickup wheels B made up of a series of wheel rims 34 which are freely disposed and are adapted to operate so that any earth that clings to the beet as it is elevated will be inclined to shake off the beet before it has reached the topping knives during the elevating of the beet by the unit wheels B.

Each rim wheel 34 carries a series of pickup spikes 40. These spikes 40 are equally spaced apart about the rim of the wheels 34 and are formed with a pointed conical end 41 below which a series of frusto-conical portions 42 which provide with the conical end 41 a series of annular gripping shoulders 43. The conical end 41 with the frusto-conical portion 42 is formed integral with the shank of the pickup spike 40. An annular base shoulder 44 may be formed spaced below the annular shoulder on the outer end of the spike to limit the projection of the spike 40 into the body of the beet or the shoulder 44 may be omitted and the outer rim of the wheel 34 act as a shoulder to limit the penetration of the spike 40 into the beet.

The width of the beet pickup unit wheel B is such that several of the spikes or tines 40 will penetrate into each beet. The beets are adapted to be plowed loose in the ground by the plows 45 illustrated in Figure 1.

In the operation of the harvester the unit pickup wheels B will roll over the crowns of the loosened beets and the tines or spikes 40 will be pressed into the crown of the beet through the foliage and the beet will be automatically lifted out of the ground by the rotation of the pickup units B. With several tines 40 piercing into the crown of the beet, we have found that our harvester will pick up the beets and carry the same up to the topping knives or saws 32. The foliage of the beets may slide by the freely disposed wheel rims 34.

When the units B are assembled on the idler pulleys C our tines or spikes 40 may be set in staggered relation with the adjacent wheels 34 so that the spikes are not in line transversely. We prefer to have the spikes set in this manner when the pickup units are assembled so as to insure the covering of a ground area by the tines 40 as the pickup wheels travel over the ground.

We provide a series of cam arms 46 which are adjustably supported by the shoulders 47 to the frame 39 which carries the unit wheels B. We provide the cam arms 46 between each of the wheel rims 34 and one on the outside of either side of the unit wheels 34. The cam arms are each provided with a cam surface on end 48 which is adapted to be set in a position so as to regulate the depth of penetration of the tines in the body of the beet at the point where the beet is topped by the topping saws 32. Thus we are able to adjust the cam arms 46 so that the beets may be topped at a predetermined point as they are carried around by the wheel units B.

The units B are adapted to be power driven as well as being driven by contact with the ground. The driving of the units B is accomplished through the drive chain 49 which is driven by the chain 50 from the rear wheels 11 of the trailer harvester A. The chain 49 rotates pulley unit C. An adjustable idler pulley 51 takes care of any slack in the drive chain 49.

The unit wheels B are supported by the floating frame 39 which is counter-balanced by a series of coil springs 52 one of which is illustrated in Figure 1. The forward end of the frame is pivoted near the forward end of the trailer at 53 as illustrated in Figure 1.

We provide an operating lever 54 which through the links 55 will raise and lower the unit frame 39 which supports the idler pulleys C. Thus the pickup unit wheels B may be raised and lowered by the operator. The links 55 are inter-connected by means of a pin and elongated slot connection, as indicated at 55¹, whereby the frame 39 is floatingly supported. The counter-balancing springs 52 aid in the lifting of the pickup wheel units B.

In operation of the harvester A as the sugar beets have been topped and the body of the beet is discharged on to the chutes 33, the crown of the beet with the foliage will travel around to a lower position where the adjustable cam arms 56 will force the tops and the foliage off the spikes or tines 40. The arms 56 are adjustable in a similar manner to the adjustment of the cam arms 46. As the tops with the foliage are pushed off the tines 40, the same will fall on to a conveyer 57 which is located below the conveyers 22 and 23 and is shown by breaking away a portion of these respective conveyers as illustrated in Figure 3. The foliage conveyer 57 is operated by the shaft 18 through the chain drive 58 illustrated in Figure 3.

The spikes or tines 40 may be mounted to the rim wheels 34 with a spring cushion 59 as illustrated in Figure 2. When the tines 40 are mounted in this manner they are cushioned so should one of the tines strike a rock or object that it can not penetrate it will spring back into the socket 60 formed in the wheel rim 34. The illustration in Figure 2 is only suggestive and it is apparent that the tines 40 may be resiliently mounted in any suitable manner.

As illustrated in Fig. 1, arms 61 supported by the frame 39 may be provided between and projecting below the rims 34 to control the depth of penetration of the spikes 40 into the crown of the sugar beet or vegetable. The arms 61 are adjustable in a similar manner to the adjustment of the cam arms 46.

The unit pickup wheels B are unique in construction, they travel around on the frame 39 being supported by the idler pulleys C and the frame is adjustable to set the wheels B in any desired position in relation to the ground. The harvester A is adapted to be drawn in the fields where the beets are being harvested with the tines 40 of the wheels B passing along over the tops of the beets so the tines can penetrate into the beets as they are loosened from the ground by the plows 45. The pickup units may be set in the frame 10 side by side or one ahead of the other (not illustrated). The entire harvester is adapted to be made of light material so that it may be readily drawn along behind any tractor or it may be self-propelled by supplying a driving mechanism having a source of power. The unit wheels B are designed to be light in weight and each rim wheel 34 is spaced apart at desired distances so that the wheels will clear themselves of earth and foliage as they rotate. The beets are quickly topped as they reach the topping saws and are carried away by the conveyers 22 and 23 and the foliage is carried to either side of the harvester by the conveyer 57. Thus the harvester is designed to be easily operated in a beet field and may be used to harvest other vegetables similar to beets which normally grow in the ground. The harvester A may be made in any form, size or design. The drawings illustrate one form in which our harvester may be made but this is only suggestive and we desire to extend our invention within the scope of the claims hereof.

We claim:

1. A beet harvester unit including a series of freely disposed wheel rims rotatable about a common axis, a series of pickup tines projecting from the rim of said wheels, idler pulleys spaced about the axis of rotation of said wheel rims to support said wheel rims in a unit with the adjacent wheel rims spaced apart, and with the tines projecting from the edge of said wheel rims.

2. A beet harvester including a frame and ground wheels for supporting said frame, one or more beet pickup wheel units, a series of idler pulleys for supporting said pickup wheel units, internal gear means on said wheel units for driving said wheel units and for engagement with said idler pulley supporting means, a series of beet pickup tines projecting from the periphery of the wheel units, and annular shoulders formed around said tines to prevent the beets from slipping off the tines as they are elevated.

3. A beet harvester comprising a frame, ground wheels for supporting said frame, a beet pickup wheel unit, a floating frame pivoted on one end to said supporting frame and having idler pulleys for supporting the unit pickup wheels, said beet pickup wheel unit including, a series of spaced apart wheel rims having internal teeth for engaging the supporting idler pulleys and for holding said wheel rims in line spaced apart from each other, a series of beet pickup tines projecting from the rims of said pickup wheels, topping saws adjacent the periphery of said wheel unit for cutting the crown off the beets as the beets are carried around the pickup wheels, cam means on said floating frame and extending beyond the periphery of said pickup wheel rims for adjusting the position of the beet before it is topped, cam means on said floating frame and extending beyond said tines for discharging the crown and foliage of the beet off said tines after the beet has been topped, conveyer means on said first frame and below said topping saws for carrying the beets away from the harvester and conveyor means on said first frame and below said last cam means for carrying the tops away from the same.

4. A sugar beet harvester unit comprising a pickup wheel unit, said unit including a series of wheel rims spaced apart and freely disposed to travel on a series of supporting idler wheels, internal gears formed on each of said pickup rims engaged by said idler wheels, and a series of spaced apart pickup tines projecting from said rims, each said tine having annular shoulders formed around the same in spaced relation to each other to engage the body of the beet and hold the same while it is being elevated and topped.

5. A beet harvester unit for picking up sugar beets out of the ground comprising a series of wheel rims, internal teeth formed on each of said wheel rims, a series of beet pickup tines projecting from the periphery of said rims and equally spaced apart around the outside rim of the wheels, a series of idler pulleys having rods for engaging said teeth on said rims to support said wheel rims spaced apart and free to rotate on said idler wheels, the tines projecting from said wheel rims having means for holding the beets from slipping off as the beets are elevated by said pickup units and while the beets are being topped.

6. A beet harvester pickup unit including a series of wheel rims, a series of idler pulleys on which said rims rotate, a frame collectively supporting said idler wheels, beet pickup tines projecting from the periphery of the wheels of said pickup unit, said tines on each wheel rim being set in staggered relation to the adjacent tines carried by an adjacent wheel rim, and means for rotating said beet pickup wheel units to carry beets out of the ground and around to a point where the beets are automatically topped.

7. A beet harvester unit comprising a series of freely disposed wheel rims, a series of circumferentially spaced idler pulleys supporting said wheel rims to space the wheel rims apart, a frame supporting said idler pulleys, and a series of beet pickup tines projecting from the periphery of each of said wheel rims to provide a band-like beet pickup unit bristling with pickup tines in staggered relation to each other.

8. A beet harvester pickup unit including a series of freely disposed wheel rims, internal gear teeth formed on said rims, sprocket-like idler pulleys for engaging said teeth on said rims, a unit frame supporting said sprocket idler pulleys as a unit, a series of spaced apart pickup tines supported by said wheel rims, each tine having projecting shoulders along the sides thereof to retain the beets on the tines and said pickup units forming a large wheel bristling with projecting tines and with the wheel rims spaced apart to permit earth and feet foliage to drop through the same in the operation of said pickup unit.

9. A beet harvester pickup unit comprising a series of freely disposed wheel rims, a series of sprocket wheels forming idlers on which said wheel rims are adapted to rotate, said sprocket wheels including spaced disc means spacing the freely disposed wheel rims apart, a unitary frame for supporting said idler sprockets, a series of beet pickup tines bristling from the periphery of each of said wheel rims.

10. A beet harvester comprising one or more wheel units, each unit including a frame, a series of large diameter wheel rims, said rims being freely disposed in relation to each other, sprocket wheels on said frame for supporting said wheel rims to hold the same in line to rotate about a common axis, a series of beet pickup tines carried by each of said wheel rims, to provide the rims with bristling tines, each of said tines, having shoulder means formed about the same, to provide beet retaining barbs on each tine to prevent the beets from freely sliding off the tines as the beets are elevated out of the ground by said units.

11. A beet harvester having a beet pickup unit comprising a series of freely disposed wheel rims of a large diameter, a unitary supporting means for said wheel rims, including a frame and a series of idler sprockets on said frame and on which said wheel rims are adapted to rotate, said sprockets including spaced disc means holding said wheel rims spaced apart, and a series of resilient beet pickup tines mounted in the periphery of said wheel rims, to provide an annular band-like wheel bristling with beet pickup tines.

12. A beet pickup unit for a beet harvester comprising a frame, a series of freely disposed large diameter wheel rims, adjustable idler sprocket wheels on said frame for supporting said wheel rims to space the same apart and to hold the same in parallel planes, said wheel rims rotating about a common axis, and a series of resilient mounted beet pickup tines on said wheel rims, each tine having shoulders to prevent the beets from sliding off the tines as the beets are elevated out of the ground.

13. A sugar beet harvester including a series of beet pickup units, said units each comprising a frame, a series of large diameter freely disposed wheel rims, internal teeth formed on each of said wheel rims, sprocket wheels including spaced discs on said frame supporting and spacing said wheel rims apart, and a series of resilient mounted beet pickup tines bristling from the peripheral edge of said wheel rims.

14. A beet harvester comprising one or more beet pickup unit wheels, each of said wheels made up of a series of freely disposed wheel rims, sprocket wheels supporting said wheel rims for rotation about a common axis, a frame supporting said sprocket wheels in spaced relation about said axis, and beet pickup tines bristling from the peripheral edge of each of said wheel rims to form an annular band-like wheel unit, the outer surface of which bristles with beet pickup tines, and which is adapted to be rotated over the crowns of the beets in the ground while the beets are plowed loose, and as the large beet pickup wheel rotates the beets picked up by the tines will be elevated out of the ground into a position to be topped.

15. A beet harvester unit comprising a series of freely disposed wheel rims, a series of idler pulleys for supporting said wheel rims to space the wheel rims apart, a frame for supporting said idler pulleys, a series of beet pickup tines projecting from the periphery of each of said wheel rims, and arm means supported by said frame and extending below the periphery of said rims to control the depth of penetration of said tines into the beets.

JAMES B. BINGHAM.
THOROLF H. HERBERG.
ORLANDO A. HOLKESVIG.

REFERENCES CITED

The following references are of record in the file of this patent:

UNITED STATES PATENTS

| Number | Name | Date |
|---|---|---|
| 922,084 | Carroll | May 18, 1909 |
| 1,317,927 | Lint | Oct. 7, 1919 |
| 1,533,672 | Stockstill | Apr. 14, 1925 |
| 2,235,470 | Betty | Mar. 18, 1941 |
| 2,350,173 | Loucks | May 30, 1944 |
| 2,371,422 | Bowman | Mar. 13, 1945 |